United States Patent [19]
Ohba

[11] Patent Number: 5,918,404
[45] Date of Patent: Jul. 6, 1999

[54] APPARATUS FOR INHIBITIVELY PREVENTING BIRDS FROM GATHERING

[75] Inventor: Tadao Ohba, Wakou, Japan

[73] Assignee: Ohba Building Maintenance Co., Ltd., Tokyo, Japan

[21] Appl. No.: 08/781,894

[22] Filed: Dec. 30, 1996

[30] Foreign Application Priority Data

Dec. 31, 1995 [JP] Japan .................. 7-14660 U

[51] Int. Cl.$^6$ .................. A01M 29/00; E04B 1/72
[52] U.S. Cl. .................. 43/1; 52/101; 116/22 A
[58] Field of Search .................. 43/1, 98, 112, 43/131; 52/101; 116/22 A; 361/232

[56] References Cited

U.S. PATENT DOCUMENTS

| | | | |
|---|---|---|---|
| 3,148,417 | 9/1964 | Bellas | 52/101 |
| 4,937,988 | 7/1990 | Gratton | 52/101 |
| 4,962,619 | 10/1990 | Chatten | 52/101 |
| 5,092,088 | 3/1992 | Way | 52/101 |
| 5,146,867 | 9/1992 | Goldschmidt | 116/22 A |
| 5,261,179 | 11/1993 | Schwinler | 43/1 |
| 5,293,721 | 3/1994 | Richard et al. | 52/101 |
| 5,353,543 | 10/1994 | Teraoka | 43/1 |
| 5,497,585 | 3/1996 | Engler | 52/101 |
| 5,606,830 | 3/1997 | Townsend, Jr. et al. | 43/1 |
| 5,649,394 | 7/1997 | Ohba | 52/101 |
| 5,666,767 | 9/1997 | Ohba | 52/101 |

FOREIGN PATENT DOCUMENTS

| | | | |
|---|---|---|---|
| 2507058 | 12/1982 | France | 52/101 |
| 2705199 | 11/1994 | France | 43/1 |
| 3914894 | 10/1989 | Germany | 52/101 |
| 4-10789 | 3/1992 | Japan . | |
| 5-36868 | 12/1993 | Japan | 52/101 |
| 7-28379 | 5/1995 | Japan . | |
| 2218885 | 11/1989 | United Kingdom | 116/22 A |
| 2221232 | 1/1990 | United Kingdom | 116/22 A |
| 2237826 | 5/1991 | United Kingdom | 52/101 |
| WO 89/06090 | 7/1989 | WIPO | 116/22 A |

*Primary Examiner*—Michael J. Carone
*Assistant Examiner*—Darren Ark
*Attorney, Agent, or Firm*—Andrus, Sceales, Stake & Sawall

[57] ABSTRACT

The present invention provides an apparatus for inhibitively preventing birds gathering wherein the wire-shaped member spanned between the adjacent support columns will not slack or break, nor will the support column fall, even when the wire-shaped member is trodden with shoes; a wire-shaped member 2 is tightly spanned between the adjacent support columns 1 in nearly the horizontal direction, and onto the wire-shaped member 2, magnetic members 3 are disposed by any means in an evenly spaced relationship; and at least one springy member is interposed between the support column 1 and the wire-shaped member 2 or on the middle portion of the wire-shaped member. With this structure, if the wire-shaped member is trodden with shoes, the elasticity of the springy member absorbs the force and prevents the wire-shaped member from slacking or breaking.

6 Claims, 14 Drawing Sheets

PRIOR ART

APPARATUS FOR INHIBITIVELY PREVENTING BIRDS FROM GATHERING

BACKGROUND OF THE INVENTION

1. Field of the Invention

The present invention relates generally to an apparatus for inhibitively preventing birds such as pigeons, crows or the like from gathering at a veranda, handrail of stairs, rooftop or the like, and from unpleasant contamination with their droppings.

2. Description of the Related Art

In recent years, more and more birds such as pigeons, crows, sparrows, gray starlings or the like are becoming inhabitant in residential areas in proportion to the increase of residential sections and the decrease of forests caused by the expanding population.

These birds are liable to gather on the rooftop of buildings, verandas of condominiums or the like, and to contaminate these places not only with their droppings and fallen feathers but also with discharging infectious bacilli. However, out of the spirit to prevent cruelty to animals, any means such that the bird's blood is shed should be refrained from use. In view of foregoing fact, various proposals have been made with respect to an apparatus for inhibitively preventing birds from approaching by scaring them away or the like.

Particular attention has been paid to the fact that a bird dislikes powerful magnetism which adversely affects its biological magnetism, which the bird possesses and uses for determining the direction of flight or as the guidepost to return to its home position by itself, and various apparatuses for inhibitively preventing birds from gathering have been proposed, in which the use of magnets is featured.

For example, Japanese Utility Model Publication No. 4-10789 "An Apparatus for Inhibitively Preventing Pigeons from Crowding" discloses an apparatus, in which a tension wire is tightly spanned between two adjacent support columns, and hemispherically-shaped magnets are latched along said tension wire. With this structure, the magnetism generated by the magnets deprives the polarity of the magnet in a pigeon's body and prevents it from flying thereto.

Magnetism is, however, generally effective for preventing pigeons, but there are some pigeons which are not sensitive to the magnetic field. In fact, experiments show that some pigeons perched on the tension wire between adjacent said hemispherically-shaped magnets. Such result is not satisfactory to users.

To cope with the foregoing problem, the present invention proposes an apparatus for inhibitively preventing birds from gathering which is characterized in that a wire-shaped member is tightly spanned first between two adjacent support columns in the horizontal direction, then a plurality of rotatable cylindrical hollow magnetic members and cylindrical hollow members are rotatably fitted onto said wire-shaped member as to cover the latter without any exposure thereof (Japanese Utility Model Application No. 7-28379).

This apparatus prevents birds from gathering by repelling many of them with a high intensity of magnetic field generated from the magnets inserted through with the wire-shaped member, and also by rotating of rotatable cylindrical hollow members which cover the wire-shaped member. If an insensitive bird should try to perch on the wire-shaped member, the cylindrical hollow members turn around and around, unabling the bird's feet to seize thereon, resulting in the bird amazingly flying away from the cylindrical hollow members. Thus, birds can not perch on it. The cylindrical hollow magnetic members also prevent birds in the same manner as cylindrical hollow members do. When a bird tries to perch directly on it, it rotates itself around the wire-shaped member in the same manner as aforementioned, advantageously resulting in the bird amazingly flying away therefrom.

Figure 13:
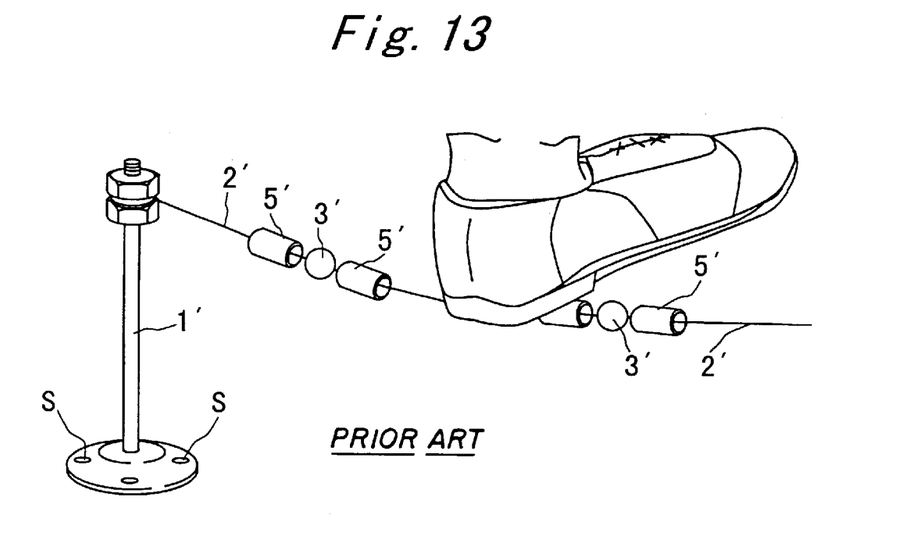
FIG. 13 illustrates an apparatus for inhibitively preventing birds from gathering according to the related art.

However, when an apparatus in which the magnetic members 3' and the cylindrical hollow members 5' are disposed onto the wire-shaped member 2' tightly spanned between said two support columns 1' is mounted at a location, e. g., at a window frame of a building or the like as shown in FIG. 13, there occurs inconvenience such as normal getting into/out of the room through the window by people for window cleaning, additional construction work, fire fighting operation or the like. In such cases, the wire-shaped member 2' in said apparatus became a kind of obstacle for work, causing workmen inconvenience to step it over each time. One way to remove this inconvenience is to make the support column 1' detachable by using a screw or the like, but it is troublesome to attach and detach many of the screws at height every time work is done. Thus, workmen often resulted in treading on the wire-shaped member 2' with shoes, causing a fear that the wire-shaped member 2' might slack or break, or the support column 1' might fall down when only some adhesive was usable, because the location for mounting did not allow the use of screws to fit the support column 1' thereon. It was feared that the effect for repelling birds might decrease in such a way.

SUMMARY OF THE INVENTION

The present invention has been made in consideration of the aforementioned background. An object of the present invention is to provide an apparatus for inhibitively preventing birds from gathering in which, when the wire-shaped member is trodden with shoes, the wire-shaped member does not slack nor break and the support column does not fail.

In order to attain the aforementioned object, the present invention provides an apparatus for inhibitively preventing birds from gathering in which a plurality of support columns are disposed standing upright in the regularly spaced relationship, a wire-shaped member is tightly spanned between adjacent said support columns in the nearly horizontal direction, magnetic members are disposed by any means onto said wire-shaped member in the regularly spaced relationship, and at least one springy member is added to be interposed between the support column and the wire-shaped member or on the half way of the wire-shaped member. In addition to the interposition of the springy member, the support column itself may be made elastic.

When a springy member is disposed between the support column and the wire-shaped member, it is recommendable that the springy member is attached to an end of the wire-shaped member then latched onto the support column. When the wire-shaped member is long enough, one or more of springy members are disposed between adjacent wire-shaped members. For a springy member, any type of spring may be used, e. g., a coil spring, a blade spring or the like, so long as it can accumulate strain energy by actuating its elasticity.

When the magnetic member disposed onto the wire-shaped member is composed of a single magnetic member, no problem occurs. However, when two magnetic pieces compose a magnetic member, it is recommendable that the magnetic pieces are attached onto the wire-shaped member with the joint of the two pieces being arranged vertically with respect to the longitudinal direction of the wire-shaped member. It is further recommendable to attach a positioning member between the two magnetic pieces.

It is also recommendable that a rotatable cylindrical hollow member is rotatably fitted onto the wire-shaped member between the support column and the magnetic member or between the adjacent magnetic members. It is preferable that, in addition to cylindrical hollow members, the magnetic member itself is prepared in the form of a cylinder and rotatably fitted onto the wire-shaped member as to enable to rotate around the latter.

Further, when the support column is elevated, a plurality of the wire-shaped members, instead of one, may be tightly spanned between the adjacent support columns nearly in parallel to each other. This structure is especially effective on large birds, e. g., on crows.

Additionally, preparing the end of the wire-shaped member in the form of a loop is desirable so as to enable the latching of the wire-shaped member to the support column to be done simultaneously with a single action. With a looped end, the wire-shaped member is attached only by latching directly onto the support column or onto a hook prepared thereon.

BRIEF DESCRIPTION OF THE DRAWINGS

The present invention is illustrated in the following drawings.

DETAILED DESCRIPTION OF THE PREFERRED EMBODIMENTS

The present invention will now be described in detail hereinafter with reference to the accompanying drawings which illustrate preferred embodiments thereof.

Figure 1:
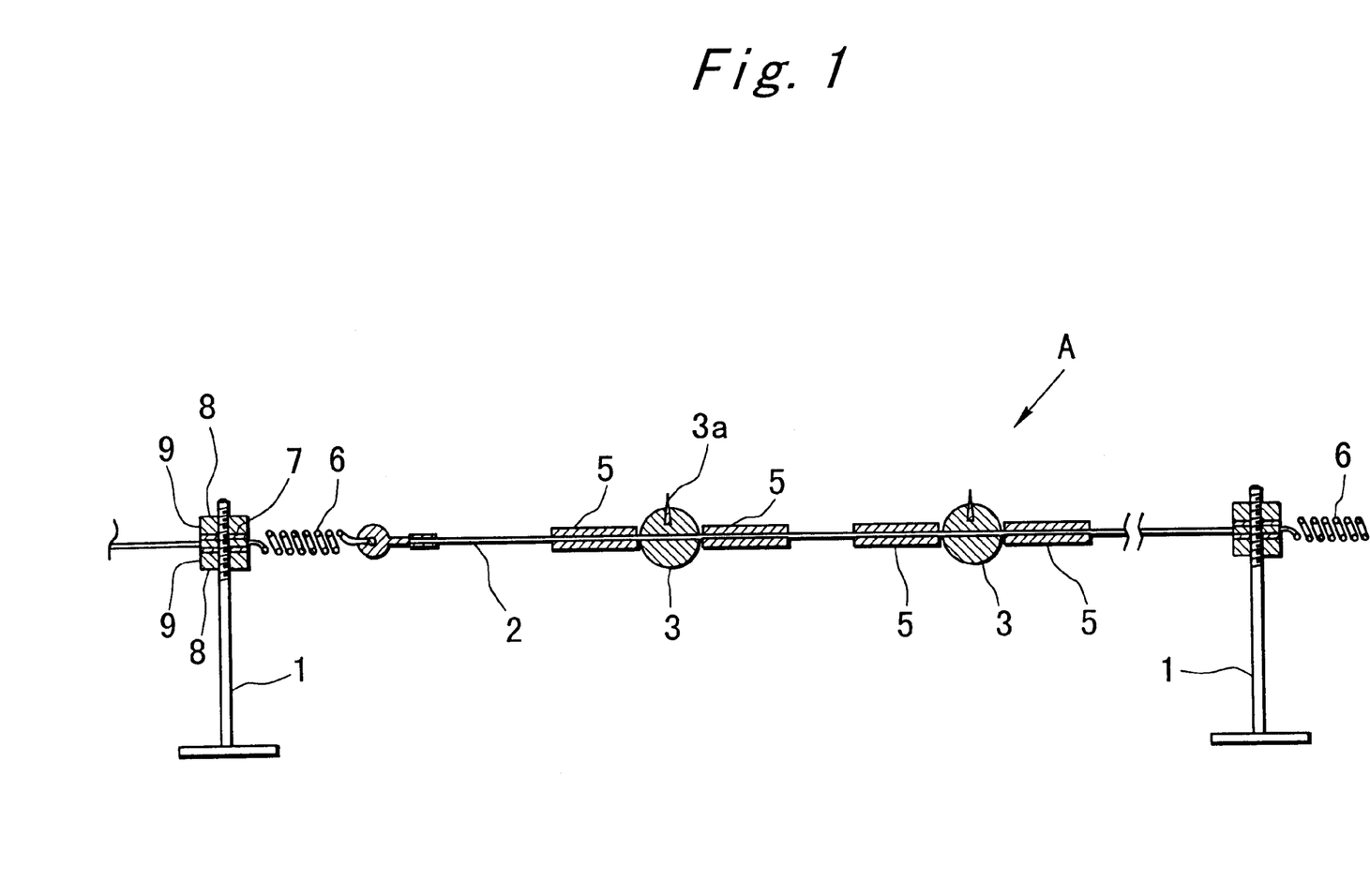
FIG. 1 is a front cross section view showing an apparatus for inhibitively preventing birds from gathering according to an embodiment of the present invention.
Figure 2:
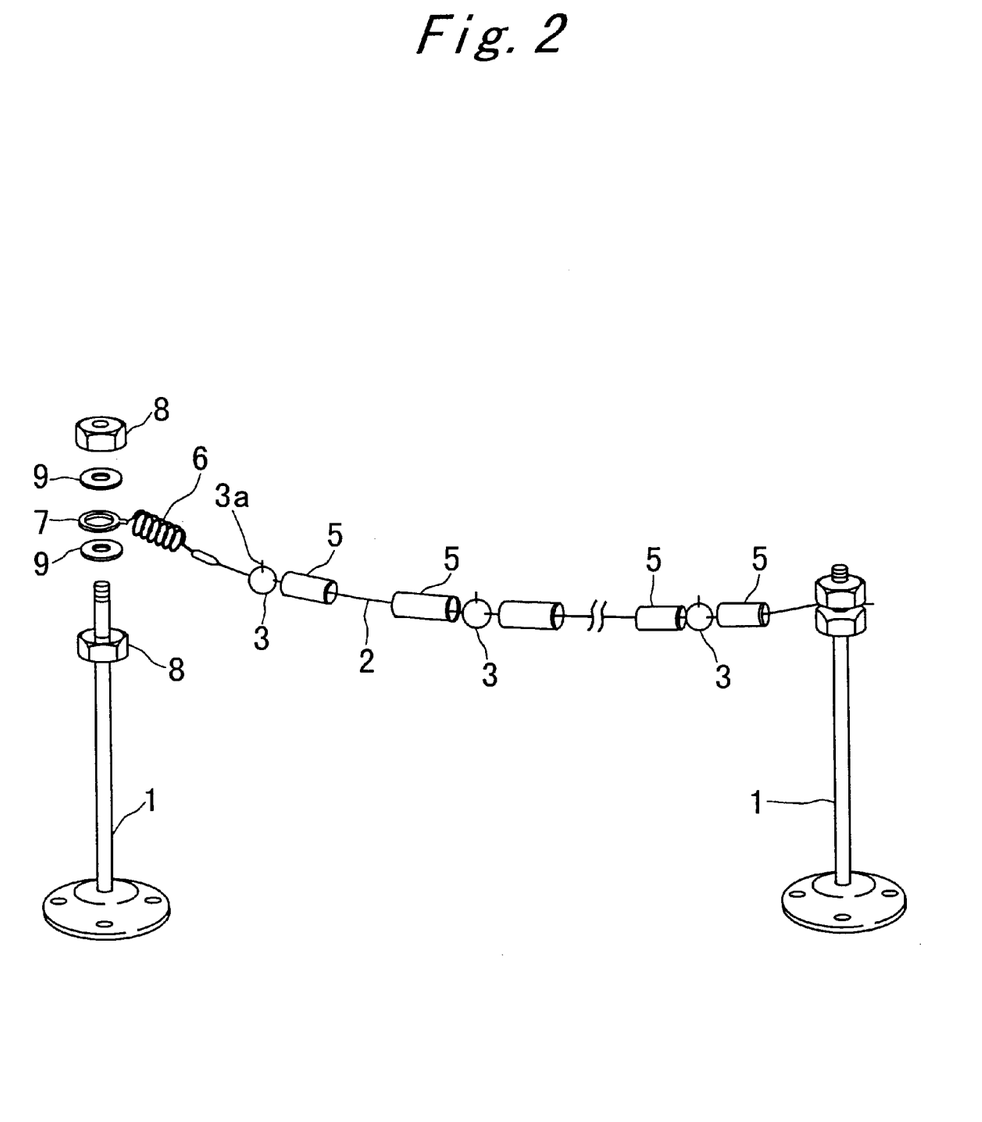
FIG. 2 is a partial exploded front view of FIG. 1.

FIG. 1 is a front cross section view of an apparatus A for inhibitively preventing birds from gathering and illustrates an embodiment of the present invention. FIG. 2 is a partially exploded front view of FIG. 1.

In these drawings, reference numeral 1 designates a support column which is prepared in the form of a bolt, a round rod material, a rod-shaped material having a square cross-sectional contour, a plate-shaped material, a pillar or the like, made of materials such as wood, metal, plastic or the like, and mounted at a location where it is unacceptable that a bird perches and drops his excrement, by using an adhesive or tightening bolts and nuts or the like. The foregoing unacceptable location is exemplified by a handrail on the veranda of residential mansion, a rooftop of a living mansion or a temple, a rooftop of a building or the like.

A height of a support column 1 will be changed from bird to bird, e. g., in the case of pigeons, experiments show that the desirable height is about 10 cm.

Reference numeral 2 designates a wire-shaped member which is tightly spanned between the adjacent support columns 1. When a plurality of the support columns 1 are disposed at intervals of, e. g., 90 cm standing upright, the wire-shaped member 2 is used by winding around the support columns 1 until the predetermined length is obtained.

Figure 3:
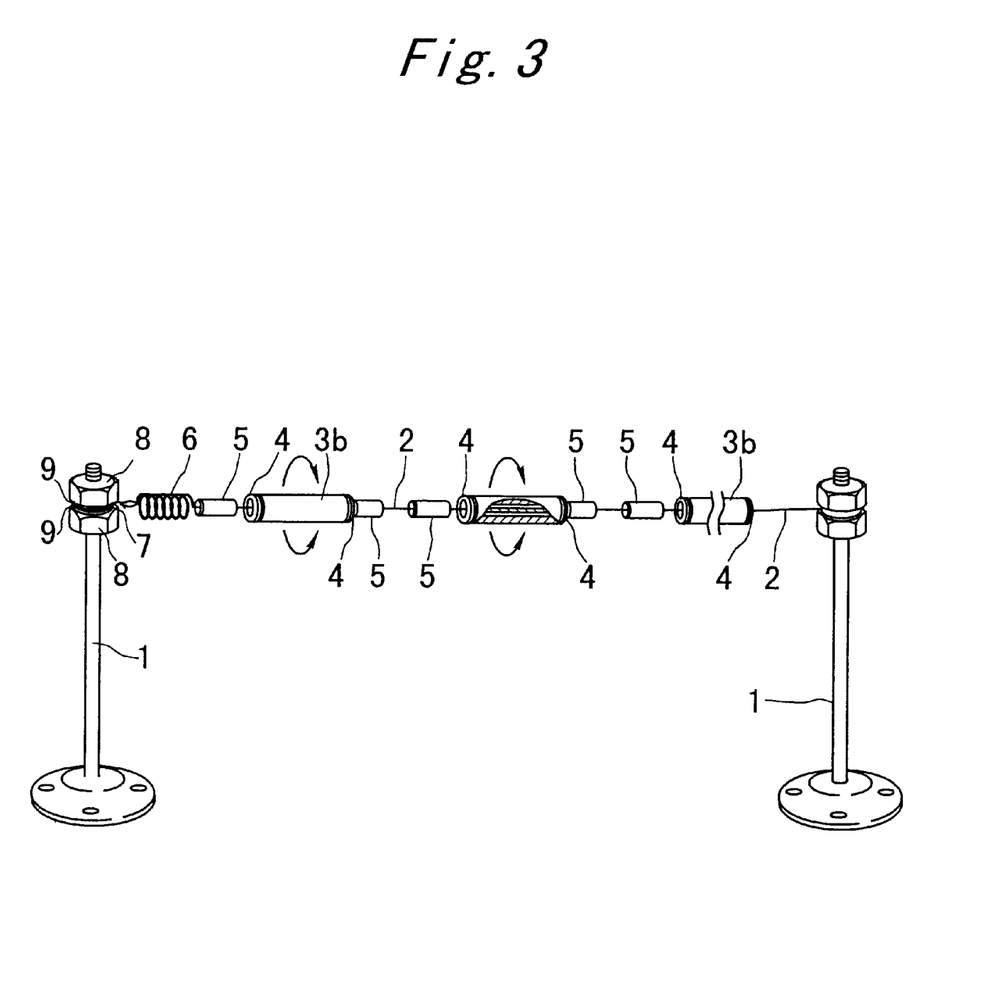
FIG. 3 is a front view of an apparatus for inhibitively preventing birds from gathering according to another embodiment of the present invention in which a magnetic member is used.

Reference numeral 3 designates magnetic members which are disposed by any means onto the wire-shaped member 2 in the regularly spaced relationship. Any contour is acceptable for the magnetic member 3, e. g., spherical, hemispherical, disc-like or the like. 3a represents a needle which is disposed standing upright at the upper part of the magnetic member in order to scare and discourage birds from perching. 3a may be omitted at a location where the needle is liable to injure people or birds (the figures illustrate an example in which 3a is not used in a part). Although in FIG. 1 the magnetic member 3 is prepared in the form of sphere, it may be prepared in the form of a cylinder 3b as seen in FIG. 3 and be rotatably fitted onto the wire-shaped member 2 so as to rotate around the latter. In this case, when a bird tries to perch directly on the cylindrical hollow magnetic member 3b, the magnet itself turns around and around with no stability, effectively causing the bird to amazingly flying away therefrom. When a cylindrical hollow magnetic member 3b is employed, it is recommendable to dispose the locating washers 4 at the opposite ends of each of the magnet to assume the original position of the latter.

Figure 14:
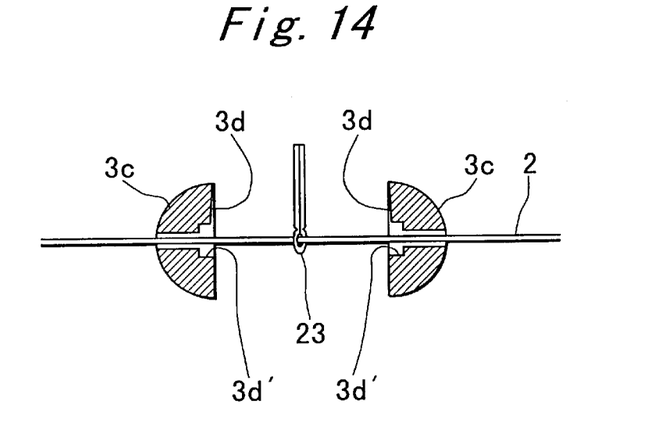
FIG. 14 illustrates the manner employed to fit spherical magnetic members, which are constructed according to the present invention, onto the wire-shaped member.
Figure 15:
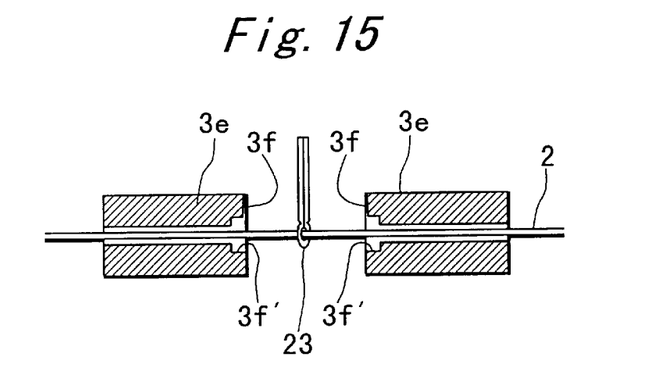
FIG. 15 also illustrates the manner employed to fit cylindrical hollow magnetic members which are constructed according to the present invention, onto the wire-shaped member.
Figure 16:
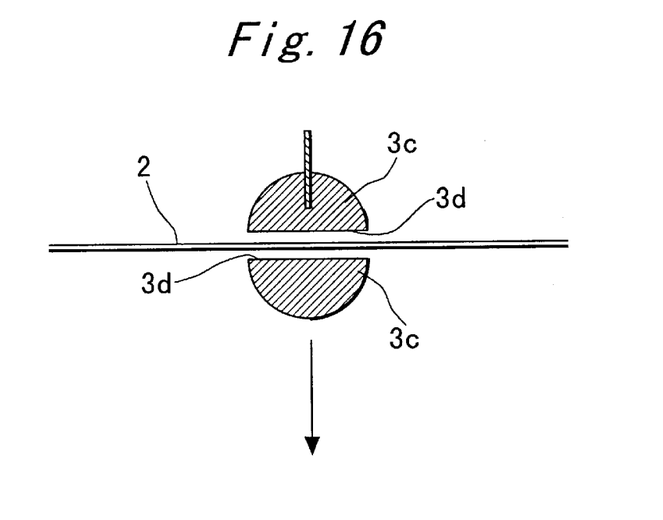
FIG. 16 illustrates the manner employed to fit conventional magnetic members onto the wire-shaped member.

In the case of a spherically-shaped magnet, if the spherically-shaped magnetic member 3 is prepared monolithically, no problem occurs. However, some commercially available spherical ones are known to be prepared by joining two hemispheres. To attach such magnetic member 3 onto the wire-shaped member 2, it is desirable that the joint 3d of hemispheres 3c is arranged to be vertical with respect to the longitudinal direction of the wire-shaped member 2 as shown in FIG. 14. Similarly, when the magnetic member 3 is not spherical but cylindrical, it is desirable that the joint 3f of a cylindrical hollow magnetic members 3e is arranged to be vertical with respect to the wire-shaped member 2 as shown in FIG. 15.

This is because two hemispheres 3c are adhered into a sphere usually by applying an adhesive on the joint surface, and the adhesive layer may peel off as time passes, breaking the sphere into halves. In such a case, if the joint 3d of two hemispheres is arranged in parallel with the longitudinal direction of the wire-shaped member 2 as shown in FIG. 26, there is a dangerous possibility of the hemispherical magnetic members' falling. Thereupon, if the joint 3d and 3f of hemispheres 3c and semicylinders 3e respectively are arranged to be vertical with respect to the longitudinal direction of the wire-shaped member 2 and the magnetic pieces separate as seen in FIG. 14 and FIG. 15, the magnetic member will not depart from the wire-shaped member. This has an advantage in safety.

Additionally, it is recommendable to attach a positioning member 23, as needed, to the magnetic member. This prevents the magnetic member 3 from moving to one side and also from coming off and falling from the wire-shaped member 2 in case the latter should break.

The method of attaching the positioning member 23 is concave parts 3d' and 3f' are prepared on the magnetic pieces 3c first, then a piece of wire is caulked into the concave parts 3d' and 3f' to be fixed; opposite ends of the magnetic member 3 are caulked; washers are used or the like.

Reference numeral 5 designates a cylindrical hollow member which is rotatably fitted onto the wire-shaped member between the support column 1 and the magnetic member 3 or between the adjacent magnetic members 3. The cylindrical hollow member 5 turns around and around and allows no bird to perch thereon, causing the bird amazingly flying away therefrom.

Recently, wretched accidents have happened, such that a wire, a fishing line or the like entwines birds' legs, causing them necrosis. To avoid any possibility that a bird's feet directly touch the wire-shaped member 2 (wire) and get injured, the apparatus according to the present invention covers the wire-shaped member with the cylindrical hollow members without any exposure thereof.

In this case, the cylindrical hollow member 5 may be prepared in the form to cover the whole length of the wire-shaped member 2, but since a touch by a bird's foot is effective enough, it does not matter if a part of the wire-shaped member 2 is exposed without the covering of the cylindrical hollow member 5.

Reference numeral 6 designates a springy member at least one of which is interposed between the support column 1 and the wire-shaped member 2 or on the middle section of the wire-shaped member 2. The springy member 6 is intended to prevent the wire-shaped member 2 from slacking or breaking by actuating its elasticity when the latter is trodden. As seen in FIG. 2, "between the support column 1 and the wire-shaped member 2" means the location where the springy member 6 is attached to the end of the wire-shaped member 2, and preferably, the end of the wire-shaped member 2 to be prepared in the form of a loop 7. When the loop 7 is latched onto the support column 1, then tightened with the nut 8 and the washer 9, attaching/detaching of the wire-shaped member 2 from the support column 1 becomes easier. Additionally, for a pair of the support columns 1, one springy member 6 attached to either of them is effective enough. Still, one springy member 6 for each support column 1 is also acceptable.

When the interval between a pair of the support columns 1 is set 2–3 m or longer, one or a plurality of springy member 6 may be interposed on the middle section of the wire-shaped member 2.

Any elastic material can be used for the springy member 6, e. g., a coil spring, a blade spring or the like as far as it expands/contracts by actuating its elasticity.

Figure 17:
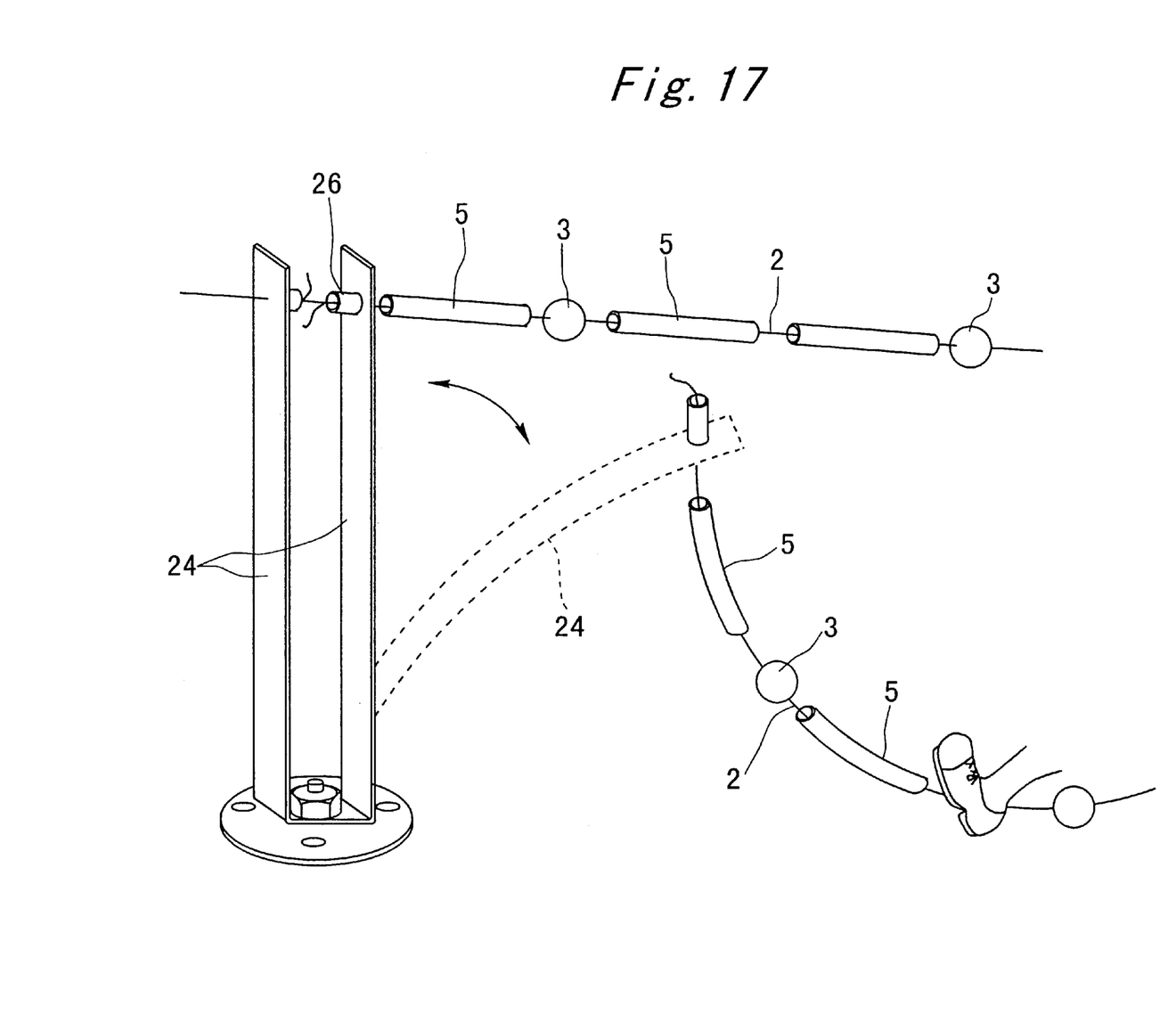
FIG. 17 is a front view to illustrate an embodiment wherein the support columns are made elastic.
Figure 18:
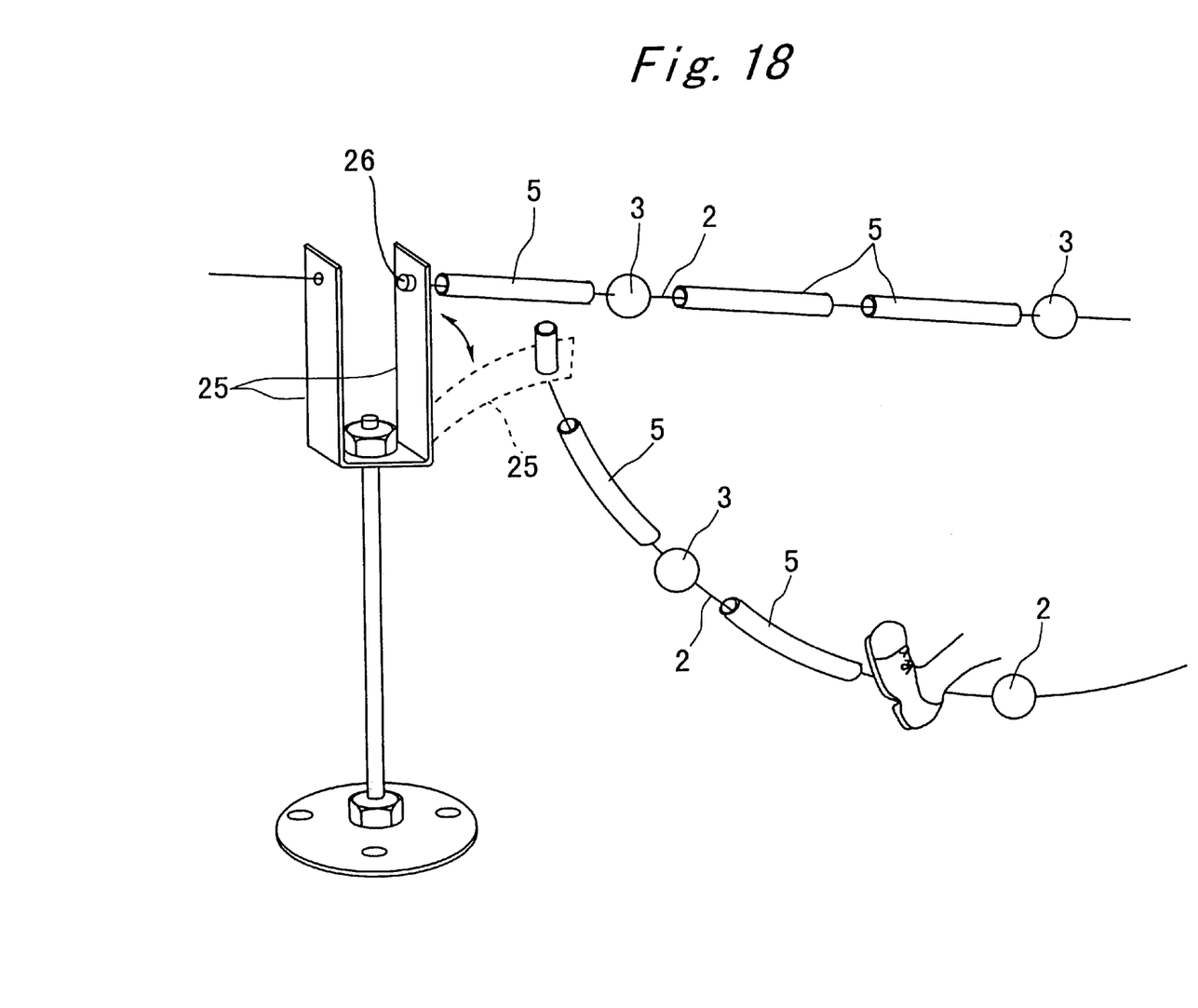
FIG. 18 is a front view to illustrate an embodiment wherein the support columns are made elastic.
Figure 19:
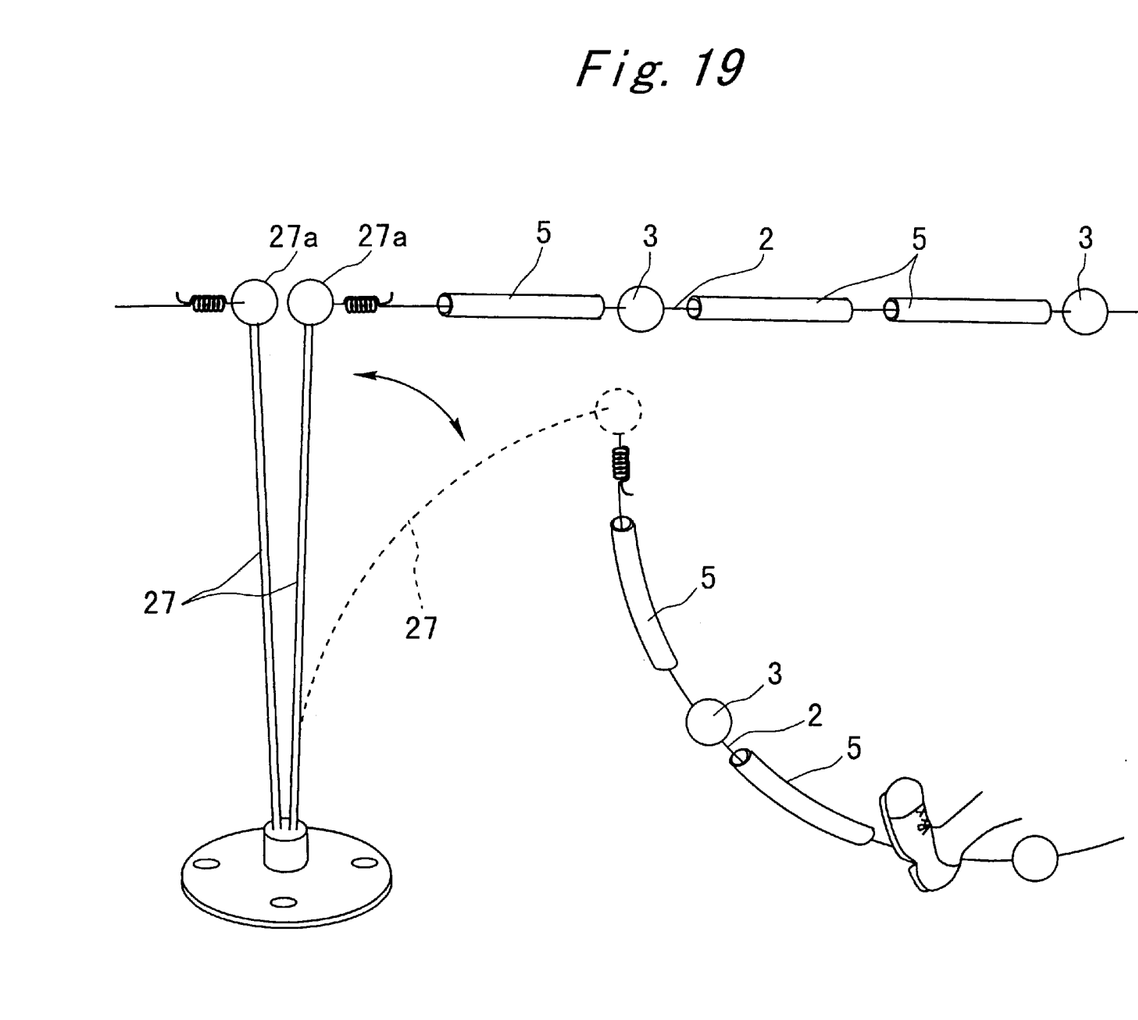
FIG. 19 is a front view to illustrate an embodiment wherein the support columns are made elastic.
Figure 20:
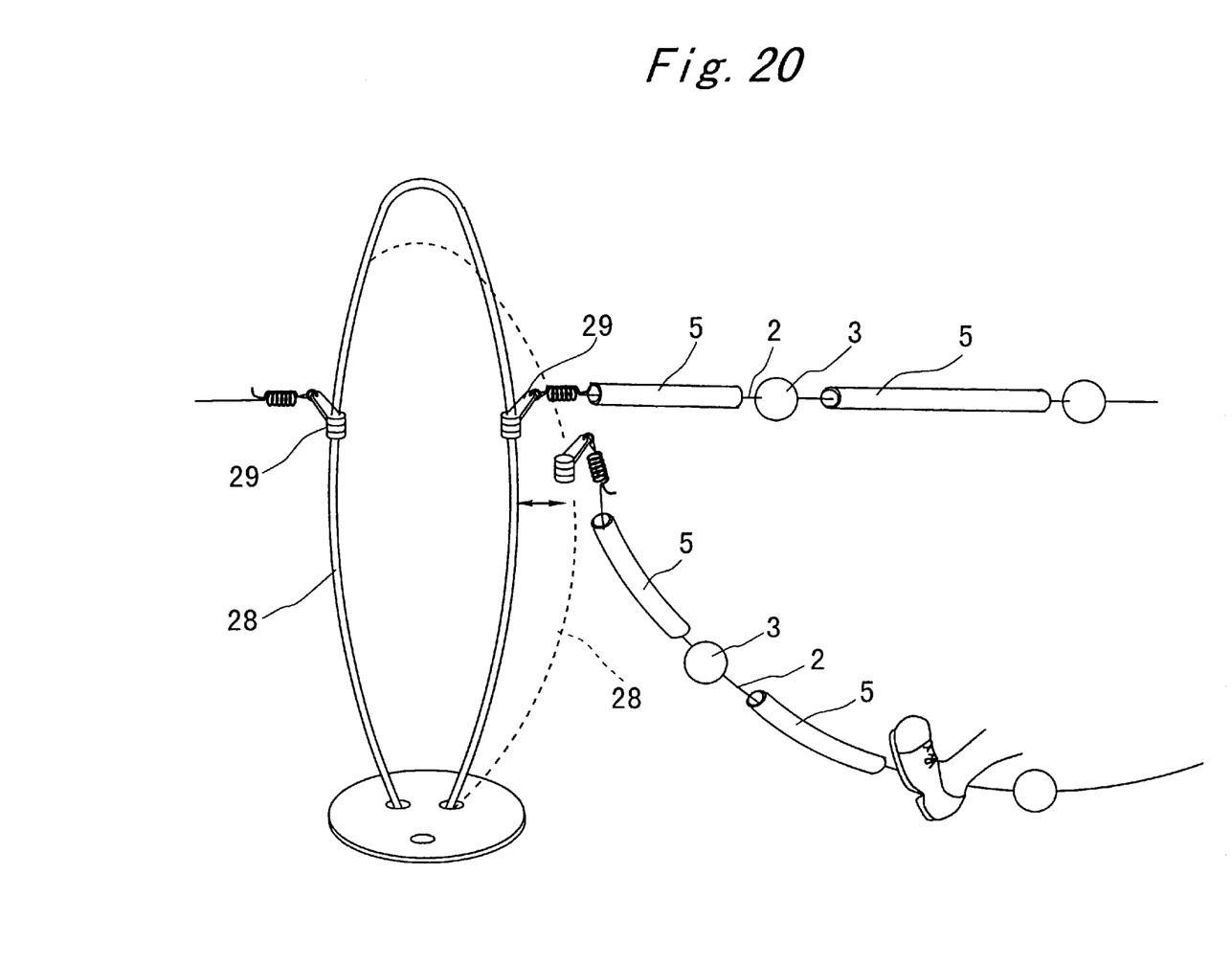
FIG. 20 is a front view to illustrate an embodiment wherein the support columns are made elastic.

FIG. 17 to FIG. 20 exemplify the cases in which the support column itself is made elastic instead of using said springy members. In FIG. 17 and FIG. 18, the whole of the support column 1 (24) or a part of it (25) is made of steel sheet. The end of the wire-shaped member 2 is caulked with the rivet 26. FIG. 19 exemplifies a case in which a pair of the stainless steel bars (steel bar) 27 are disposed standing upright, substituting the support column 1. FIG. 20 exemplifies a case in which a stainless steel bar (steel bar) is prepared in the form of a loop 28 and latched onto the hardware latch 29. In the case of FIG. 19, it is acceptable just to bend the upper edge of the stainless steel bar 27. However, under certain circumstances, a magnet of like-pole 27a (south pole with south pole or north pole with north pole) may be attached at the upper edge of it. In this case, the magnetic members repulse each other, causing shakes on the stainless steel bar 27. This enlarges the magnetic field and increases the repellent effect on birds.

In all the examples in FIG. 17–FIG. 20, in the same manner as in the aforementioned embodiment, the support columns 24, 25, 27 and 28 absorb the flexure which is caused by the wire-shaped member 2 being trodden and solve the problem of breaking of the wire-shaped member 2 or of falling of the support column itself. It is a convenient advantage for workmen that they can work without worrying about the wire-shaped member 2.

Figure 4:
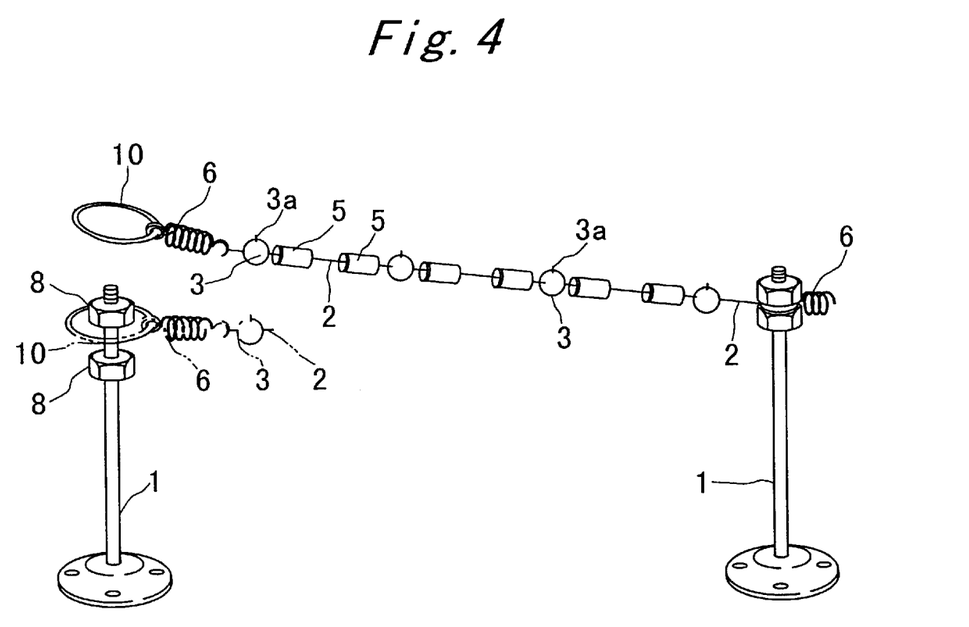
FIG. 4 is a front view of an apparatus for inhibitively preventing birds from gathering according to another embodiment of the present invention in which the end of the wire-shaped member is prepared in the form of a loop.
Figure 5:
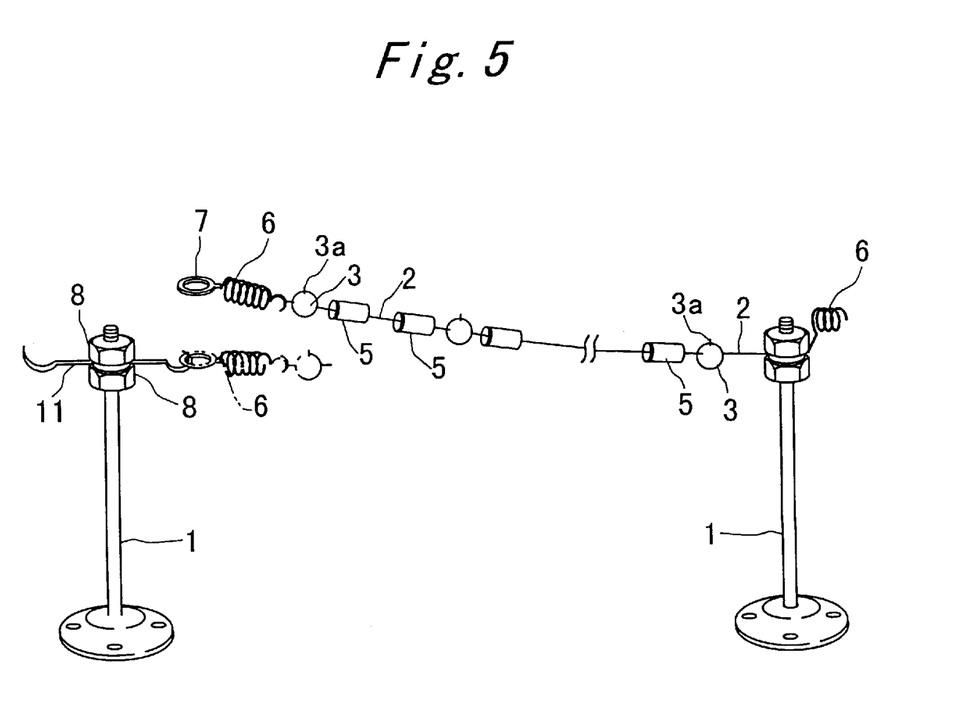
FIG. 5 is a front view of an apparatus for inhibitively preventing birds from gathering according to an embodiment of the present invention, wherein the end of the wire-shaped member is a further embodiment.

FIG. 4 and FIG. 5 show other embodiments that the end of said wire-shaped. member 2 is prepared in the form of a loop 7. FIG. 4 exemplifies a case that the diameter of the loop 10 is made larger than the nut 8. In aforementioned FIG. 2, the loop 7 is latched onto the support column 1, then tightened with the nut 8 and the washer 9. On the contrary, the loop 10 can be advantageously latched onto the support column 1 while the nut 8 tightened thereon.

The example in FIG. 5 is a case that the hook 11 is previously attached onto the support column 1 by using the nut 8, then the loop 7 is latched onto the hook 11. Both cases are advantageous because the attaching/detaching of the wire-shaped member onto the support column becomes easier.

Figure 6:
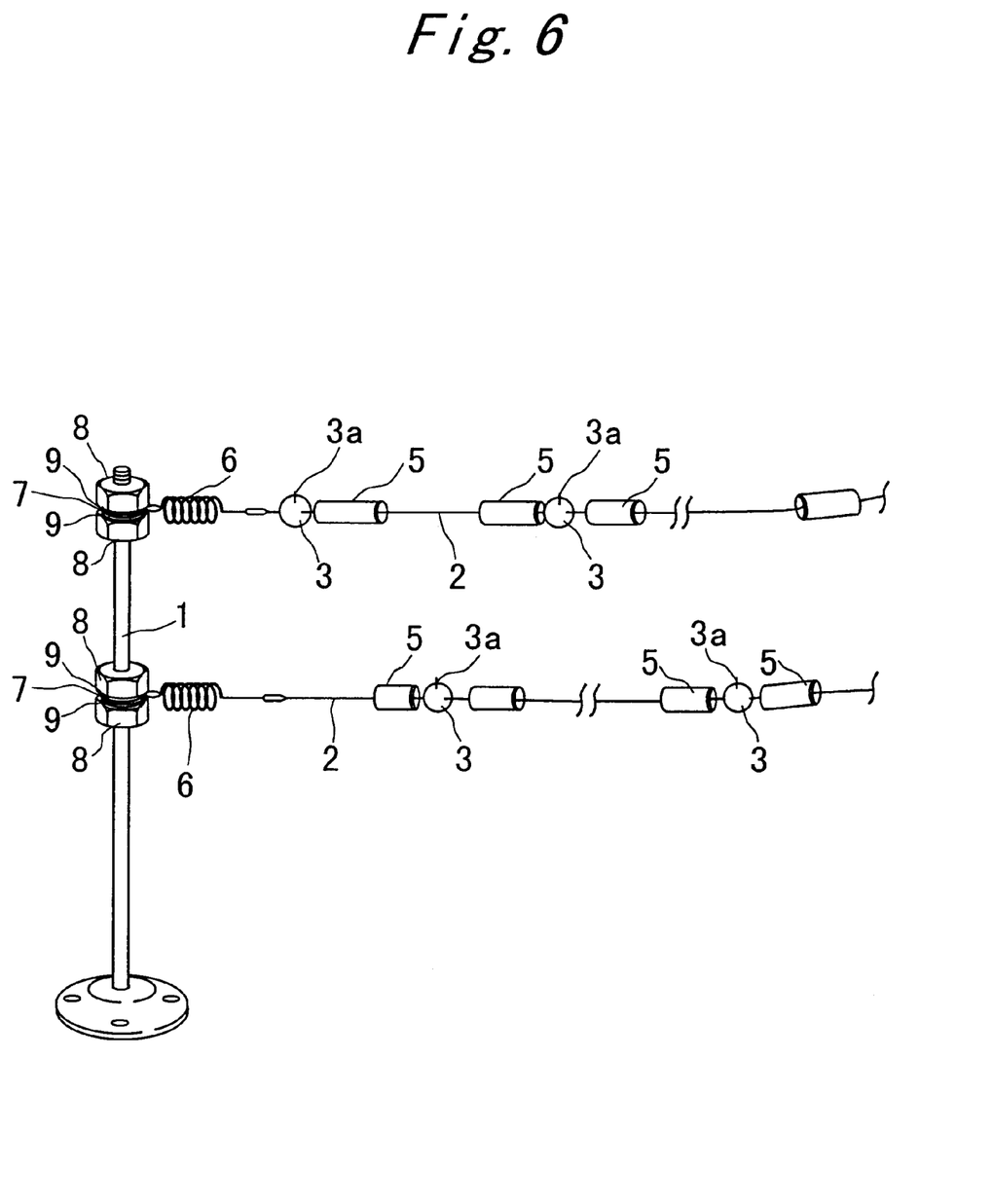
FIG. 6 is a front view of an apparatus for inhibitively preventing birds from gathering according to another embodiment of the present invention.

FIG. 6 exemplifies an embodiment where a plurality of the wire-shaped members 2 are tightly spanned between the adjacent support columns 1. This structure is especially effective on large birds. In the case of a crow, for example, it is effective to set the height of the support column 1 about 20 cm. When enough space is available for the interval between the above and below wire-shaped members 2, no problem will occur (e. g., in the case of a crow, 10 cm is recommended as the space between the above and below wire-shaped members). If some reason forces the shortening of this interval, the magnetic member 3 may be arranged in shifted positions on right and left as seen in FIG. 6 in order to prevent the magnetic members 3 above and below from magnetically attracting each other.

Figure 7:
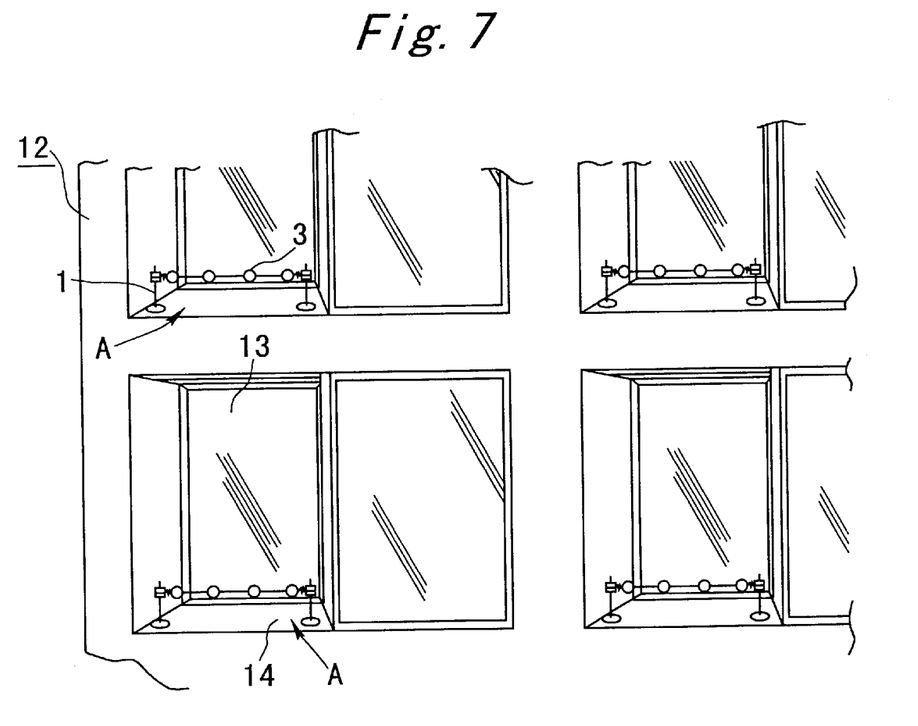
FIG. 7 is a perspective view of an apparatus for inhibitively preventing birds from gathering according to the present invention mounted at a window of a building.
Figure 8:
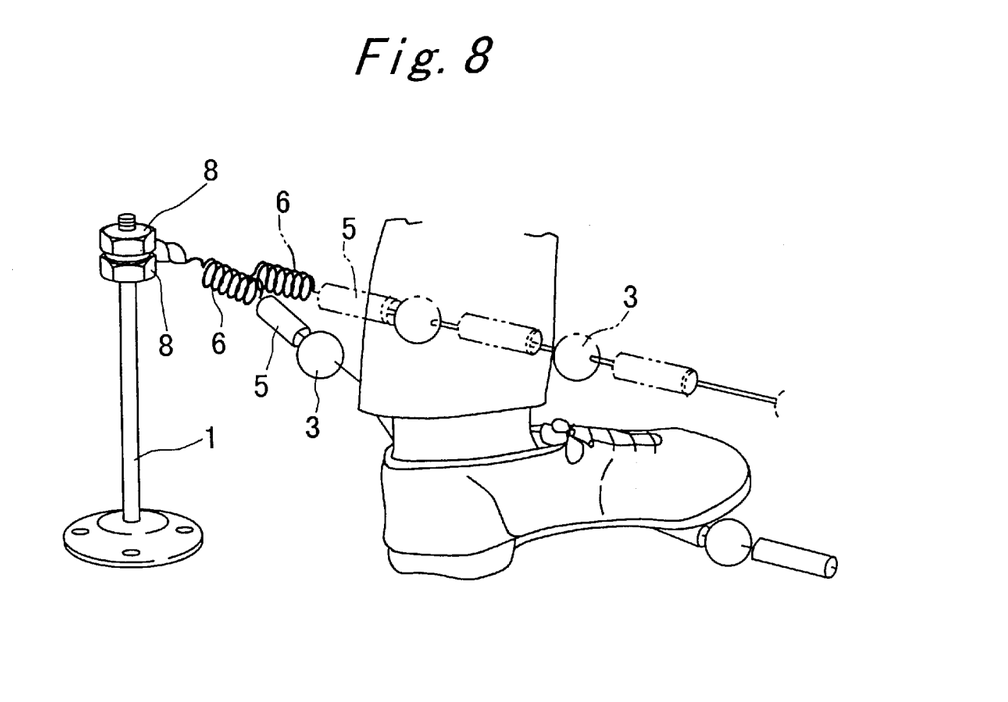
FIG. 8 illustrates an apparatus for inhibitively preventing birds from gathering according to the present invention.

FIG. 7 exemplifies a case that the window 13 of the building 12 is concaved and at the bottom 14 thereof an apparatus A for inhibitively preventing birds from crowding according to the present invention is mounted in order to prevent birds from perching thereon. In a case where that a workman for window 13 cleaning or other work steps on the bottom of the concave 14 and should tread on the wire-shaped member 2 as seen in FIG. 8, the elasticity of the springy member 6 absorbs the force, preventing any damage on the support column 1 or the wire-shaped member 2. Some particular locations, where an apparatus for inhibitively preventing birds from gathering is to be mounted, do not allow the use of screws to fit the support column 1 thereon, and an adhesive is used for mounting. In such a case, problems used to occur, e. g., the falling of the support column 1 by the wire-shaped member 2 being trodden on or the like. With the springy member 6 disposed, tasks are conveniently improved requiring no more attention to the wire-shaped member 2.

Figure 9:
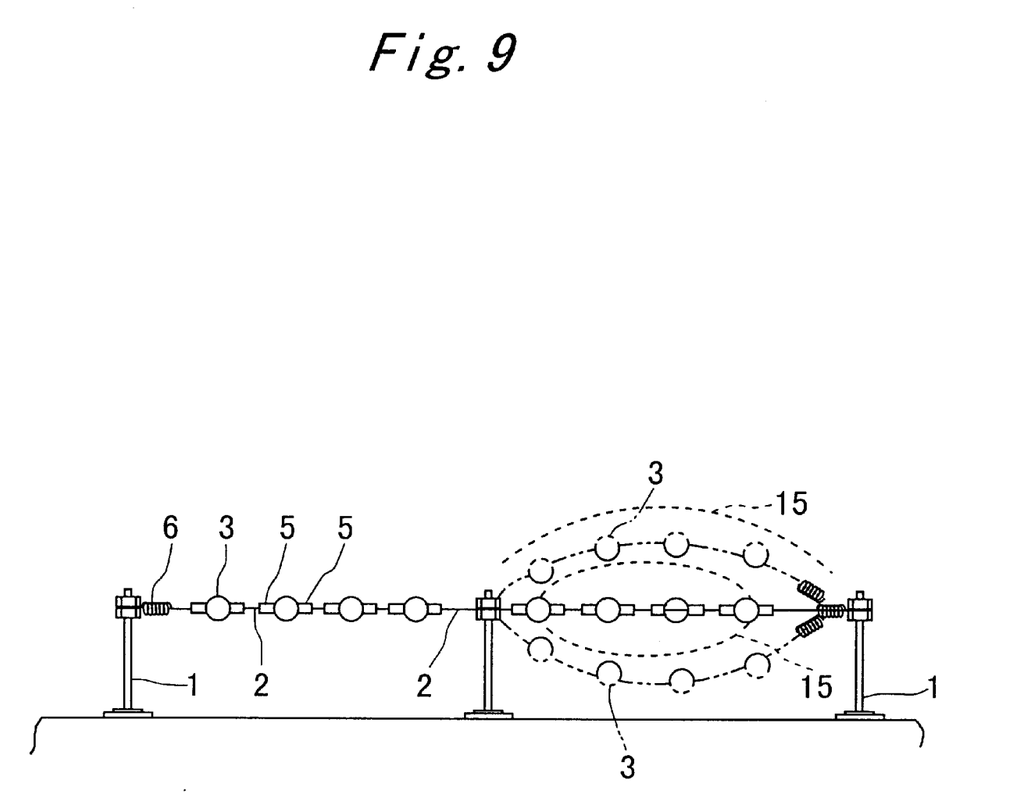
FIG. 9 is an explanatory view of FIG. 8 which illustrates the operative state of the magnetic field.
Figure 10:
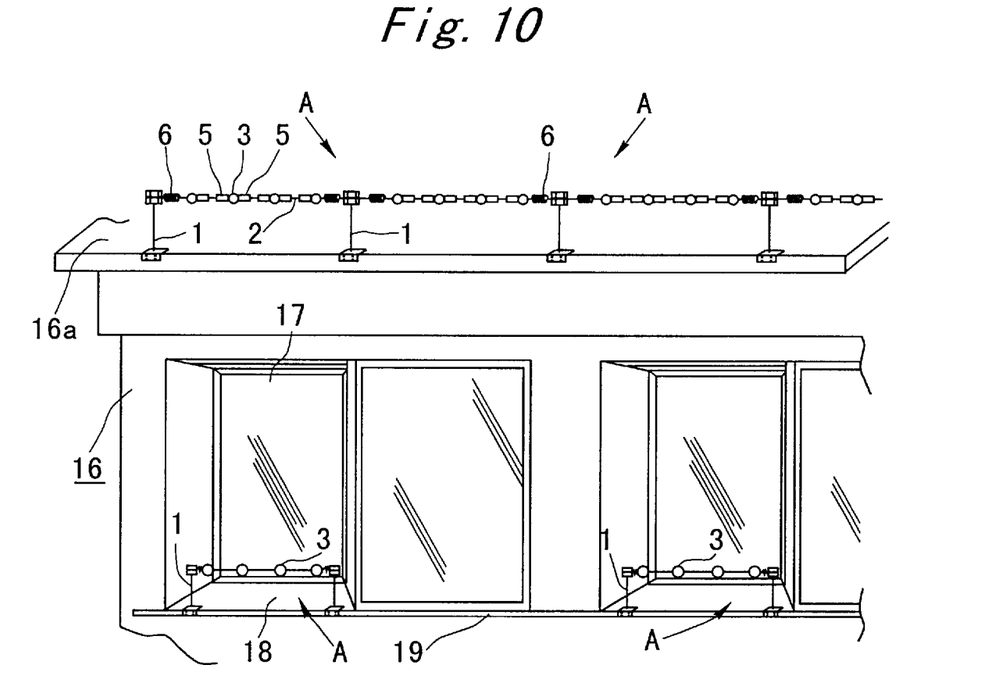
FIG. 10 is a perspective view of an apparatus for inhibitively preventing birds from gathering according to the present invention, showing an embodiment in which the apparatuses are mounted at the window or the hood of a mansion.
Figure 11:
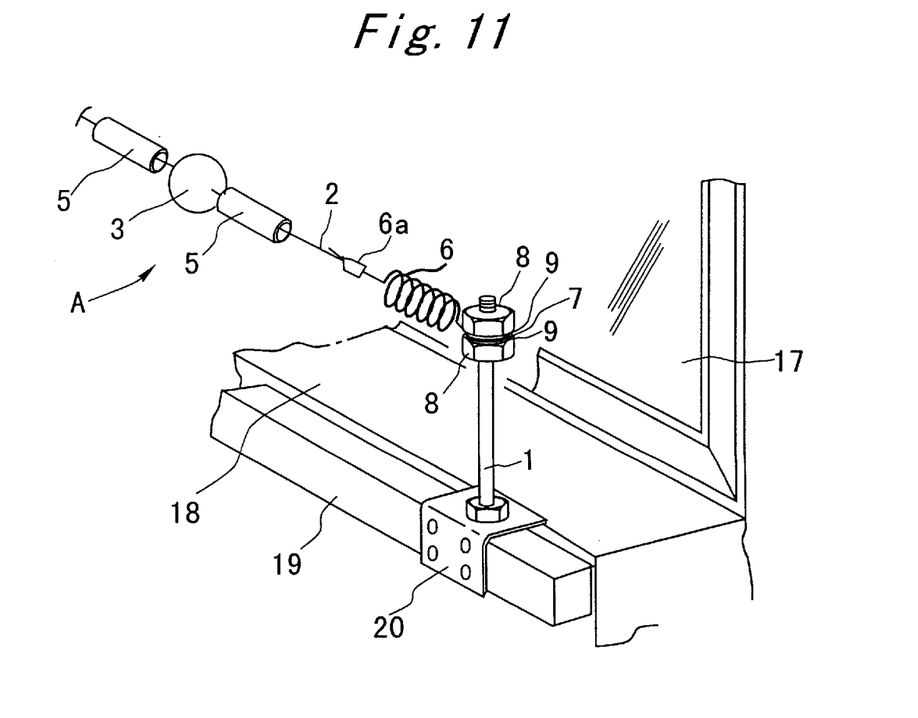
FIG. 11 is a fragmentary enlarged perspective view of the principal part of FIG. 10.

In addition, with the springy member 6 arranged, its function causes shakes on the wire-shaped member 2, whenever a bird touches the wire-shaped member 2. This action enlarges the magnetic field 15 as shown in FIG. 9 to enhance the dispersing effect on birds. FIG. 10 illustrates an embodiment where an apparatuses for inhibitively preventing birds from gathering are mounted at the bottom 18 of a window 17 of a condominium 16 or on the roof 16a, and FIG. 11 is an enlarged perspective view of the principal part of FIG. 10. In case similar to the the window frame or the roof is the most suitable location to mount the apparatus, because these places are particularly liable to be perched by birds and contaminated with their droppings. In addition, it is recommendable that a square rod 19 is attached at the bottom 18 of the window 17 in a manner so as not to obstruct the opening/closing of the window 17, then an L-shaped base metal fitting 20 of the support column 1 is attached onto the square rod 19. 6a represents a caulking metal fitting.

Figure 12:
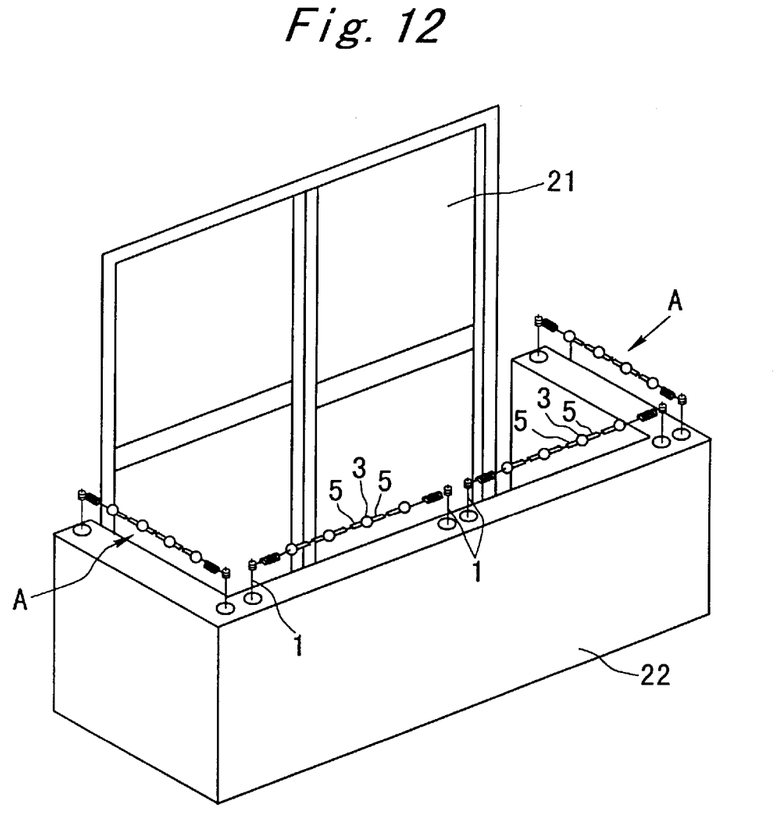
FIG. 12 is a perspective view of an apparatus for inhibitively preventing birds from gathering according to an embodiment of the present invention, showing the embodiment wherein the apparatuses are mounted at the veranda of a mansion.

FIG. 12 exemplifies an apparatus A for inhibitively preventing birds from gathering according to the present invention, and is mounted at the veranda 22 which is located in front of the entrance 21 to the veranda from the mansion. This part is also an effective location to mount the apparatus, because birds often perch and contaminate with their droppings thereon.

Usually, when many of the support columns 1 are disposed standing upright in the regularly spaced relationship, a serial use of one wire-shaped member 2 can reduce the number of the support column 1 required as exemplified at the roof 16a in FIG. 10. However, this embodiment exemplifies a case that a wire-shaped member 2 is attached to every pair of support columns 1.

ADVANTAGES OF THE INVENTION

As described above, the apparatus for inhibitively preventing birds from gathering according to the present invention has a springy member interposed between its support column and its wire-shaped member. With this structure, when the apparatus is mounted at a location such as the window frames of each floor of a building or the like, and when the wire-shaped member of said apparatus should be trodden by a workman on his getting in/out of said window for window cleaning or construction works, the elasticity of the springy member absorbs the force, preventing the wire-shaped member from slacking or breaking. This enables workmen to work without worrying about the wire-shaped member, resulting in better working efficiency than before when workmen had to step the wire-shaped member over each time.

In addition to that, shaking of the wire-shaped member generated by the springy member enlarges the magnetic field, advantageously increasing the repellent effect on birds. Moreover, the apparatus is operated with a touch of a bird, with no particular power required. Thus, the operation of this apparatus is economical.

Further, when a rotatable cylindrical hollow member is rotatably fitted onto the wire-shaped member between a support column and a magnetic member or between the adjacent magnetic members, and when a bird tries to perch thereon by seizing the cylindrical hollow member with his feet, the cylindrical hollow member turns around and around, unabling the bird to perch thereon and resulting in the bird amazingly flying away therefrom. In this way, the repellent effect on birds is advantageously enhanced. A similar effect is obtainable when the magnetic member is prepared in the form of a cylinder and rotatably fitted so that it can rotate about the wire-shaped member. Additionally, when the wire-shaped member is covered with the cylindrical hollow members, the possibility that birds directly touch the wire-shaped member is almost completely removed and there is no fear of injuring birds.

The apparatus becomes further effective for preventing large birds from gathering, when a plurality of the wire-shaped members are tightly spanned between the adjacent support columns extending in parallel to each other.

Preparing the end of the wire-shaped member in the form of a loop enables the latching thereof onto the support column to be done simultaneously with a single action. This significantly reduces the time required for mounting the apparatus, consequently, bringing effects such as reducing the cost or the like.

While the present invention has been described above with respect to preferred embodiments thereof, it should be of course be understood that the present invention should not be limited only to these embodiments but various change or modification may be made without any departure from the scope of the present invention as defined by the appended claims.

What is claimed is:

1. An apparatus for inhibitively preventing birds from gathering, comprising:

a plurality of support columns standing upright in an evenly spaced relationship to one another;

a wire member tightly spanned between adjacent support columns, the wire member extending along a generally horizontal axis; and magnetic members disposed along the wire member in an evenly spaced relationship to one another, the magnetic members generating a magnetic field that affects the birds;

wherein the support columns are sufficiently flexible such that when a bird perches on the wire member, the support columns deflect and allow the wire member to oscillate, thereby increasing the magnetic field generated by the magnetic members, and wherein said support columns allow the wire member to be stepped on without damaging the apparatus, and allow the wire member to return to a tightly spanned configuration between adjacent support columns after having been stepped on; and wherein the magnetic members comprise two magnetic pieces which are joined to each other along a joint surface on each piece, each said joint surface extending in a vertical direction relative to the horizontal axis of the wire member, wherein a concave part is formed on the joint surface of each of the two magnetic pieces, and wherein a positioning member fixedly attached to the wire member is securely positioned in each of the concave parts to hold the magnetic members in place along the wire member.

2. An apparatus for inhibitively preventing birds from gathering, comprising:

a plurality of support columns disposed standing upright in an evenly spaced relationship;

a wire member tightly spanned between two support columns and extending along a generally horizontal axis;

magnetic members disposed along said wire member in an evenly spaced relationship, the magnetic members generating a magnetic field that affects the birds; and at least one spring member being interposed between one of the support columns and the wire member;

wherein said at least one spring member is sufficiently flexible such that when a bird perches on the wire member, the wire member deflects and oscillates to increase the magnetic field generated by the magnetic member, and wherein said at least one spring member allows the wire member to be stepped on without damaging the apparatus, and allows the wire member to return to a tightly spanned configuration between two support columns after having been stepped on; and wherein the magnetic members comprise two magnetic pieces which are joined to each other along a joint surface on each pieced, each said joint surface extending in a vertical direction relative to the horizontal axis of the wire member, wherein a concave part is formed on the joint surface of each of the two magnetic pieces, and wherein a positioning member fixedly attached to the wire member is securely positioned in each of the concave parts to hold the magnetic members in place along the wire member.

3. The apparatus for inhibitively preventing birds from gathering as claimed in claim 1, wherein a rotatable cylindrical hollow member is rotatably fitted onto the wire member between one of the support columns and one of the magnetic members or between the magnetic members.

4. The apparatus for inhibitively preventing birds from gathering as claimed in claim 1, wherein the magnetic members are cylindrical and fitted onto the wire member.

5. The apparatus for inhibitively preventing birds from gathering as claimed in claim 1, further comprising a plurality of wire members tightly spanned between adjacent support columns, the wire members being parallel to each other.

6. The apparatus for inhibitively preventing birds from gathering as claimed in claim 1, wherein an end of the member includes a loop in order to enable it to be latched onto one of the support columns.

* * * * *